Patented Sept. 26, 1944

2,358,818

UNITED STATES PATENT OFFICE 2,358,818

MAGNESIUM COMPOSITION AND METHOD OF PREPARATION

Lewis B. Miller, Ambler, Pa., assignor to Keasbey & Mattison Company, Ambler, Pa., a corporation of Pennsylvania No Drawing. Application November 1, 1940, Serial No. 363,897

8 Claims. (Cl. 23—67)

This invention relates to the utilization of dolomite and particularly to the separation of magnesium and calcium from the dolomitic material.

An object of the invention is to treat dolomite to effect a separation of the magnesium from the calcium in a simple manner and by operations which are inexpensive and precisely controllable.

My improved process consists in forming a reactive slurry of calcined dolomite and so regulating the thickness and extent of carbonation thereof as to precipitate the calcium and magnesia as calcium carbonate and magnesium carbonate crystals, such crystals being of widely different sizes so that separation of the precipitated magnesium and calcium carbonates may be effected by mechanical means.

Commonly the separation of lime and magnesia from dolomite has been accomplished by converting the lime to insoluble calcium carbonate and the magnesium to soluble magnesium bicarbonate, after which separation was effected by mechanical means. According to this method a dilute slurry was made of calcined dolomite, such slurry usually containing from 1.5% to 3% of lime and magnesia hydrates. Next this slurry is carbonated by means of a gas having a high content of carbon dioxide. A closed vessel and relatively high pressures are used and carbonation is continued until substantially all of the available magnesia is converted into soluble magnesium bicarbonate. Under these conditions the lime precipitates as insoluble calcium carbonate and the magnesia is converted to a weak solution, usually containing from 1% to 2% of magnesium bicarbonate.

Because of the chemical instability of the magnesium bicarbonate solution separation of the lime and magnesia is always accompanied by loss of part of the magnesia precipitating out and going over with the lime. Such loss increases in proportion to the time interval between the carbonating reaction and the mechanical separation of the lime and magnesia. The loss also increases in proportion to the strength of the magnesium bicarbonate and the temperature, which had to be controlled within narrow limits.

I have found that these objectionable features may be overcome and magnesium carbonate more cheaply obtained from dolomite by first calcining dolomite at low temperatures, 900° C. to 1200° C., so as to form reactive magnesium oxide and calcium oxide in a highly reactive state. Next the calcined dolomite is slurried with water to form hydrates of lime and magnesia, preferably using a relatively high concentration of the mixed hydrates. For example, concentrations of from 12% to 15% may be used conveniently, but even stronger mixtures may be used provided the slurry does not become so thick as to hinder carbonation.

The slurry is then carbonated. This may be done cheaply and easily by placing the slurry in an open vessel, pumping gases containing carbon dioxide into the bottom of the vessel so that they bubble through the slurry of magnesia and lime hydrates. Such gases need not contain a high proportion of carbon dioxide. For instance, stack gases from a boiler plant containing from 8% to 12% carbon dioxide are suitable and may be used if available.

The temperature of the slurry during carbonation or precipitation affects the course of the reaction. Thus at low temperatures, for example, below 70° F., there would at first be a strong tendency for the formation of magnesium bicarbonate solutions. When the carbonation is carried sufficiently far, however, the bicarbonate solution formed reacts with more of the calcined dolomite to give the desired crystals. At low temperatures also the crystals of magnesia will tend to be comparatively coarse. At higher temperatures there is a lesser formation of magnesium bicarbonate solution and more of a tendency to convert directly to the desired magnesia crystals although the needle crystals of magnesia under these conditions will be somewhat smaller. The concentration of carbon dioxide gas used will also affect the reaction, there being a greater tendency towards the formation of magnesium bicarbonate solution with high concentrations and pressures of $CO_2$ gas. The carbonation also tends to be relatively slow at very low temperatures so that for economic reasons low temperatures are avoided. In general, with open vessels and a rather low concentration of carbon dioxide gas, economic temperatures of operation will range from approximately 60° F. to approximately 130° F.

Carbonation of the slurry is continued until substantially all of the lime is transformed into insoluble calcium carbonate in the form of minute crystals, most of which do not exceed three microns in greatest cross section, and many do not exceed one third of that amount. I find that simultaneously with this magnesium hydrate will be converted into a crystalline carbonate of magnesium, probably a form of $MgCO_3 \cdot 3H_2O$, precipitated as comparatively large needle-shaped crystals of the order of forty microns in length.

Owing to the marked difference in the size of the calcium carbonate and magnesium carbonate crystals, separation may be made by mechanical means. I have found that this may be effected economically by centrifugal means, preferably by a continuous centrifugal process in which the calcium crystals move inward and the magnesium crystals outward. The rate of feed to the machine and the centrifugal force exerted are so chosen with respect to the particular machine and to the particle sizes of the two materials involved that optimum separation of the lime and magnesium carbonate is effected. If upon separation the magnesia product is found to be of insufficient purity, the crystals may be slurried with water and subjected to additional centrifugal separation out of the calcium crystals until the desired purity is achieved.

As an alternative, mechanical separation of the magnesium carbonate from the calcium carbonate crystals may be performed by ordinary settling processes. This may be done with the assistance of dispersing agents adapted to keep the lime particles well dispersed. The use of such dispersing agents is particularly advantageous in the second and following stages of centrifugal separation where magnesia products of higher purity are required.

By means of my process magnesium carbonates may be extracted from dolomite more easily and with less waste than heretofore. An advantage which this process possesses as compared to the common prior processes is that the mother liquor, after the crystals are removed, is very low in magnesia concentration so that relatively little loss is sustained in this way. In the usual Pattison process, for instance, losses are comparatively high. In the present process the mother liquors can in general be discarded since the loss by that means will be low. If desired, of course, they can be recirculated and reused. Furthermore my process avoids the expense occasioned by the need for high pressures and gasses having a high carbon dioxide content of the prior art.

In addition to simplifying and cheapening prior processes, the magnesium carbonate extracted by my method requires no dewatering, and it is in convenient form for further processing. For example, the crystals are suitable for technical and pharmaceutical purposes where a magnesium carbonate is desired having a solubility greater than magnesium basic carbonate. Also, the crystals, when mixed with water and asbestos fiber, may be cast into molds to form articles of insulation. Finally, the crystals may be converted readily into magnesium basic carbonate by the addition of water and heat or other appropriate reactant.

I claim:

1. The method of extracting magnesium carbonate from dolomite which consists in calcining the dolomite at relatively low temperature, slurrying the calcium dolomite with water to form lime and magnesia hydrates, carbonating the slurry within the temperature range from approximately 60° F. to approximately 130° F. until said hydrates are precipitated as relatively small calcium carbonate crystals and relatively large magnesium carbonate crystals and mechanically separating said crystals.

2. The method of extracting magnesium carbonate from dolomite as set forth in claim 1 in which the carbonation of the slurry is carried on with a gas of relatively low concentration of carbon dioxide of the order of 8% to 12% and at a pressure not exceeding atmospheric.

3. The method as set forth in claim 1 in which the slurry contains hydrates of lime and magnesia in the range above 3% and less than sufficient concentration to impede carbonation of the slurry.

4. The method of extracting magnesium carbonate from dolomite as set forth in claim 1 in which the carbonate of magnesium is precipitated at a temperature sufficiently low within the range stated to form the precipitate as comparatively large needle-shaped crystals of the order of forty microns in length.

5. The method of extracting magnesium carbonate from dolomite as set forth in claim 1 in which the precipitation is at a sufficiently high temperature within the stated range so that the insoluble calcium carbonate crystals as to most of the calcium carbonate precipitates do not exceed three microns in greatest cross section.

6. The process of producing calcium and magnesium carbonates from dolomite which comprises calcining the dolomite to convert the calcium and magnesium carbonates to oxides, slaking the oxides in water and forming an aqueous slurry containing lime and magnesia hydrates, contacting the aqueous slurry with carbon dioxide while maintaining the temperature of the slurry at below approximately 70° F., until said hydrates are precipitated as relatively small calcium carbonate crystals and relatively large magnesium carbonate crystals, and thereafter mechanically separating said crystals.

7. The method of extracting magnesium carbonate from dolomite which consists in calcining dolomite at relatively low temperature substantially in the range between 900° C. and 1150° C., slurring the calcined dolomite with water to form lime and magnesium hydrates, carbonating the slurry within the temperature range from approximately 60° F. to approximately 130° F. and with a gas of relatively low concentration of carbon dioxide of the order of 8% to 12% at a pressure not exceeding atmospheric until said hydrates are precipitated as relatively small calcium carbonate crystals and relatively large magnesium carbonate crystals, and mechanically separating said crystals.

8. The process of producing calcium and magnesium compounds from dolomite or similar material containing calcium and magnesium carbonates which comprises the steps of calcining the material to convert the calcium and magnesium carbonates to oxides, slaking the oxides to form a concentrated slurry, treating the slurry with a gas containing carbon dioxide until substantially all of the hydroxides are converted to carbonates, the slurry being maintained at a temperature sufficiently low and in the range from approximately 60° F. to approximately 130° F. to cause the formation of crystals of magnesium carbonate which are large relative to the crystals of calcium carbonate, and thereafter mechanically separating the larger crystals of magnesium carbonate from the smaller crystals of calcium carbonate

LEWIS B. MILLER.